US008999113B2

(12) United States Patent
Beldring et al.

(10) Patent No.: US 8,999,113 B2
(45) Date of Patent: Apr. 7, 2015

(54) TREATMENT, SUCH AS CUTTING, SOAKING AND/OR WASHING, OF ORGANIC MATERIAL (71) Applicant: Biogasol ApS, Ballerup (DK)

(72) Inventors: Finn Beldring, Virum (DK); Dragan Lukic, Kgs. Lyngby (DK)

(73) Assignee: Biogasol ApS (DK)

( * ) Notice: Subject to any disclaimer, the term of this patent is extended or adjusted under 35 U.S.C. 154(b) by 0 days.

(21) Appl. No.: 14/278,921

(22) Filed: May 15, 2014

(65) Prior Publication Data
US 2014/0284007 A1 Sep. 25, 2014

Related U.S. Application Data (62) Division of application No. 13/144,215, filed as application No. PCT/DK2010/050005 on Jan. 13, 2010, now Pat. No. 8,771,472.

(30) Foreign Application Priority Data

Jan. 13, 2009 (DK) .................................. 2009 00052

(51) Int. Cl.
D21C 9/00 (2006.01)
D21B 1/34 (2006.01)

(52) U.S. Cl.
CPC .............. D21B 1/345 (2013.01); D21B 1/342 (2013.01); D21B 1/34 (2013.01); D21B 1/347 (2013.01)

(58) Field of Classification Search
USPC ........... 162/49, 57, 234; 241/46.11, 46.17, 69
See application file for complete search history.

(56) References Cited

U.S. PATENT DOCUMENTS

| 3,990,643 | A | 11/1976 | Neitzel |
| 5,681,429 | A * | 10/1997 | Vuorinen ...................... 162/261 |
| 6,053,441 | A * | 4/2000 | Danforth et al. ........... 241/46.11 |
| 6,234,415 | B1 | 5/2001 | Liin |
| 2005/0103453 | A1* | 5/2005 | Kankaanpaa ..................... 162/4 |
| 2008/0054108 | A1 | 3/2008 | Matz et al. |
| 2012/0037325 | A1 | 2/2012 | Beldring et al. |

OTHER PUBLICATIONS

"U.S. Appl. No. 13/144,215 , Response filed Nov. 25, 2013 to Final Office Action mailed May 23, 2013", 15 pgs.
"U.S. Appl. No. 13/144,215, Final Office Action mailed May 23, 2013", 15 pgs.
"U.S. Appl. No. 13/144,215, Non Final Office Action mailed Nov. 2, 2012", 12 pgs.
"U.S. Appl. No. 13/144,215, Notice of Allowance mailed Feb. 24, 2014", 10 pgs.
"U.S. Appl. No. 13/144,215, Response filed Feb. 4, 2013 to Non Final Office Action mailed Nov. 2, 2012", 15 pgs.

(Continued)

Primary Examiner — Jacob Thomas Minskey
(74) Attorney, Agent, or Firm — Schwegman Lundberg & Woessner, P.A.

(57) ABSTRACT

The invention relates to a method or methods of operating an apparatus for treating material by cutting, soaking and/or washing of the material, wherein the apparatus comprises a receptacle, a discharge element with a vortex generator and a pump arranged to pump fluid and material from the receptacle towards the vortex generator, wherein the vortex generator and the pump in combination are adapted to generate a vortex in the form of a conic helix in the fluid extending into the receptacle.

12 Claims, 5 Drawing Sheets (56) References Cited

OTHER PUBLICATIONS

"U.S. Appl. No. 13/144,215, Response filed Aug. 8, 2012 to Restriction Requirement mailed May 8, 2012", 8 pgs.
"U.S. Appl. No. 13/144,215, Restriction Requirement mailed May 8, 2012", 6 pgs.
"International Application Serial No. PCT/DK2010/050005, International Preliminary Report on Patentability dated Mar. 23, 2011", 38 pgs.
"International Application Serial No. PCT/DK2010/050005, International Search Report mailed Apr. 12, 2010", 2 pgs.

* cited by examiner

TREATMENT, SUCH AS CUTTING, SOAKING AND/OR WASHING, OF ORGANIC MATERIAL

RELATED APPLICATIONS

This application is a divisional application of U.S. patent application Ser. No. 13/144,215, filed Jul. 12, 2011, which application is a nationalization under 35 U.S.C. 371 of PCT/DK2010/050005, filed Jan. 13, 2010 and published as WO 2010/081478 A1 on Jul. 22, 2010, which claimed priority under 35 U.S.C. §119 to Denmark Patent Application No. PA 2009 00052, filed Jan. 13, 2009; which applications and publication are incorporated herein by reference in their entirety.

FIELD OF THE INVENTION

The present invention relates to an apparatus for and a method of treating material, the treatment comprising e.g. cutting, soaking, washing of the material and if required processing with chemicals and heat. The material to be treated being particulate organic material, preferable organic material comprising fermentable parts and the treatment according to the present invention relates inter alia to at least forming part of a process rendering the material susceptible for further processing in a bio-ethanol production facility— such further processing may typically include decomposition e.g. decomposition of straw so as to release lignin.

BACKGROUND AND OBJECTS OF THE INVENTION

In a fermentation process adapted to produce bio ethanol, an initial processing of organic material is often required before fermentation. Often such processing has different aims such as soaking (e.g. to remove silicates, salts and mineral elements such as stones, gravel, sand and clay and/or to raise the water content), cutting, oxidizing, dewatering of the organic material and these are carried out sequentially. Thus, seen in overall reference frame, the organic material must be made susceptible to fermentation.

Particular important aspects pertaining to rendering organic material susceptible to fermentation are soaking, cutting and/or washing of the organic material. Furthermore, other aspects relates to treatment of organic material treating the material chemically and/or enzymatically. Such aspect may of course being combined with soaking, cutting and/or washing.

Soaking, in the present context, preferably means that the organic material that typically are considered to be dry (with reference to a desired liquid content) needs to soak fluid, preferably being water, such as tap water. Soaking may also be used to release and/or dissolve contaminating matter. Dry material may in some instances also be referred to as unsoaked material.

Cutting, in the present context, preferably means that the organic material is cut into pieces, such as into smaller pieces than its initial size (before being cut).

Washing, in the present context, preferably means that contaminating matter is separated off from the organic material, typically by firstly being released by and/or dissolved in the liquid and secondly separated out. The contaminating matter may be stones, gravel, metal particles, silicates, salts, mineral elements in general, sand, clay or combinations thereof. Often the contaminating matter is particulate matter and is often located on the surface of the matter.

US 2008/0054108 discloses a pulper having a tank for receiving materials to be shredded. A rotor is fixed to the rotating output of a drive and the rotor comprising an annular rotatable hub and a plurality vanes projecting generally axially from the hub. The vanes have a side edge facing an axial direction and a plurality of teeth is provided on the side edge of the vanes for providing a rapid shredding of material with a reduced energy requirement.

U.S. Pat. No. 6,234,415 discloses a pulper that includes a rotor mounted in a tube adjacent to a screening plate having holes. The rotor includes helical vanes whose diameter decreases towards the outer end of the rotor. The rotor vanes carry in the vicinity of the screening plate a radially and outwardly projecting shoulder-like element. The element forms a pressure-generating and sub-pressure-generating device which exerts an alternating effect on the pulp as the rotor rotates, therewith counteracting clogging of the holes in the screening plates.

Both these devices resides in that the flow in the tank comprises recirculation in the tank of the liquid present in the tank, which makes retention time of the material to be pulped non-controllable. The un-controllable retention time is not the primary concern in pulping, where the size distribution of the shredded pulp is the crucial parameter. Therefore the above mentioned documents also discloses pulpers, where recirculation is utilized to ensure that all pulp leaving the pulping chamber is less than a size defined by filtering and where recirculation is used to avoid clogging of the filter.

The disclosed pulpers may be workable for pulping purposes, the flow pattern includes internal recirculation so that the material may or may not get in contact with the rotor a number of times whereby the material contained in a liquid in the pulper consist of material having a divers size distribution that may result in depositing which in turn may result in e.g. clogging. Furthermore, the retention time of the material in the liquid is considered non-controllable at least for the reason of recirculation.

A further issue pertaining to such recirculation is that the retention time of the material in the liquid may become unknown and non-controllable. This may become a problem if, for instance, soaking to a certain level (water content in material) is aimed at as one of the parameters governing the soaking process is the retention time. This may in particular become an issue when dissolving of minerals such as salts is aimed at.

A particular issue pertains to have the material to be treated assimilated in a liquid. Often the material to be treated has a considerably lower density than that of the liquid and in such cases that material tends float as "lid" on an upper surface of liquid rendering it very difficult to soak the material. Especially when dealing with very hydrophobic materials such as cereal straw, corn waste materials, sawdust, rice waste materials, wood chips, energy cane, sorghum, miscanthus grass, switchgrass etc.

A still further issue pertains to the destructive nature of contaminating particles such as stone and metal pieces may have on cutting edge.

Thus, an object of the present invention is to provide an apparatus and method at least mitigating some or more of the problems pertaining to the know apparatus and methods.

A further and in many instances important object of the invention is to render initially dry material pumpable, whereby the material may be pumped towards, and used as a hydraulic sealing in, a downstream process system.

SUMMARY OF THE INVENTION

Thus, the above described object and several other objects are intended to be obtained in a first aspect of the invention by providing an apparatus for treating material, the treatment comprising—but is not limited to—cutting, soaking and/or washing of the material, the apparatus comprising a receptacle comprising wall elements defining a container adapted to contain fluid and material to be treated a discharge element in upstream fluid communication with the interior of the receptacle and in downstream fluid communication with a fluid connection, the discharge element comprising a vortex generator, pumping means arranged to pump fluid with material from the receptacle towards the vortex generator and into the downstream fluid connection, wherein the vortex generator and pumping means in combination being adapted to generate a vortex in the form of a conic helix in the fluid, the vortex extends into the receptacle.

Thus, by the present invention an apparatus has been provided in which a vortex is used to control assimilation of material in a fluid, preferably being liquid such as water, whereby at least the retention time of the material in the receptacle can be controlled in a smooth matter.

The material leaving the apparatus may be said to be fluidized in the sense that the material is assimilated in a liquid. As the material has been fluidized it can be pressurised and pumped—e.g. by the pumping means and/or further pressurization means—towards e.g. a downstream process system. Furthermore, the fluidization render the material with liquid able to provide a liquid seal in the sense that gaseous or liquid fluid will not as easily (or not at all) go through the liquid with material as it would have been able to if the material was in its initial drier form.

A specific obtainable feature in connection with the present invention is the generation of a vortex in the form of a conic helix. Conic helix, in the present context, preferably means a vortex in which the trajectory of fluid element follows the superposition of an Archimedean spiral and a helix. It should be mentioned that although the mathematics of the Archimedean spiral and the helix stipulates strictly the evolution of a conic helix, the conic helix may in the present invention deviate from such mathematical description although such a flow pattern is aimed at. However "conic helix" has been used to assemble a flow path being at least conic helix like in which fluid elements follow a path towards a centre axis in a spiraling motion as well as in a motion along the centre axis.

The vortex generated typically comprises angular velocities varying in axial direction and radial direction in relation to a rotational axis of the vortex. This is typically obtained inter alia based on the viscous coupling and damping internally in the fluid, the boundary conditions and the vortex generator.

Furthermore, secondary vortices, that is preferably vortices other the main conic helix taken up most of the space in the receptacle and generated by the vortex generator and the pumping means in combination, is often avoided.

The axial flow components of the vortex are advantageous controlled by controlling the pumping means. In many practical case, the pumping means may be seen as a means "dragging in the vortex" in a direction towards the vortex generator.

In the present context various technical wordings are used. Although these wordings are used in an ordinary meaning to the skilled person a brief explanations are presented below on some of these wordings.

"Vortex generator" is preferably used in the meaning of an element that creates a vortex in a fluid. Typical examples of vortex generators considered herein are, rotatable elements comprising rotor arms extending in a radial direction.

"Back flow" is preferably used to designated a flow regime where the flow exist that goes in a direction being opposite to a main flow direction preferably being defined from an inlet to an outlet. Back flow may in such context preferably be seen as secondary flow patterns, such as secondary vortices, where the primary flow pattern is the conic helix.

In the apparatus the unsoaked material may preferably be arranged by adapted means in the vortex such as discharged from a tube submerged in the fluid in the receptacle.

Such means adapted for arranging the unsoaked material in the vortex will below be referred to in greater details when regarding for instance specific embodiments of the invention. For instance, the means adapted for arranging the unsoaked material may comprise e.g. a fluid feed providing a fluid jet as disclosed below.

The pumping means may preferably be positioned downstream of the vortex generator, and in many preferred embodiments the pumping means and the vortex generator may be the same element, such as being build into a single structural element In many preferred embodiments, the discharge element preferably comprises a flow channel extending out from the receptacle. In such embodiments, the vortex generator is preferably positioned downstream in the flow channel as seen from an inlet of the flow channel. The flow channel of the discharge element may advantageously and preferably be funnel shaped tapering towards the vortex generator. Alternatively, the flow channel of the discharge element may preferably have a constant cross sectional area.

The apparatus may preferably comprise a separator for separating out a stream of fluid containing material that has gone through the discharge element and a residual stream of fluid containing substantial no treated material. The separator may preferably be positioned downstream of discharge element, and preferably downstream of the pumping means.

The separator may preferably comprise dewatering means, such as one or more centrifuges or means for sedimentation of the treated material.

Preferred embodiments of the apparatus may comprise a re-circulation flow line feeding fluid extracted from the receptacle to the receptacle. Such fluid re-circulation flow line may preferably be connected to the separator in such a manner that the residual fluid is re-circulated to the receptacle.

At least the wall element constituting the bottom of the receptacle may preferably have a rounded internal contour, such as being shaped as a longitudinal cut in a cylinder. Furthermore, the wall elements constituting the side of the receptacle may be flat members. However, other shapes of the wall elements may be used e.g. rounded so that they may assist in maintaining the vortex in the receptacle.

The receptacle may preferably and advantageously comprise internally one or more rotatable elements and/or one or more of the wall elements defining the containing is/are rotatable. Thereby the boundary conditions for the flow in the receptacle may be controlled e.g. to strengthen the vortex.

Preferred embodiments of the apparatus may comprise a single discharge element. Alternatively, the apparatus may preferably comprise more than one discharge element. In embodiments, comprising more than one discharge element, the discharge elements may preferably be positioned adjacent to each other in the same wall elements. Alternatively or in combination therewith, discharge elements may preferably be positioned opposite to each other in opposite wall elements.

The apparatus may preferably and advantageously be adapted to provide a pressurised stream of treated material.

Preferably, the vortex generator may comprise a rotatable cutting element and the cutting element may preferably be adapted to cut material flowing in a fluid towards the cutting element. The cutting element may preferably comprise a plurality of radially extending arms with cutting edges pointing in the rotational direction.

As disclosed above, preferred embodiments of the invention may comprise means adapted to arrange unsoaked material in the vortex. Accordingly, preferred embodiments of the apparatus may comprise a fluid feed adapted to produce a flow of fluid, preferably being a jet, emerging into fluid contained in the container during operation of the apparatus. The outlet of the fluid feed may preferably be arranged below the surface of the fluid. Advantageously, the fluid feed may preferably form part of the re-circulation flow line. The fluid feed may preferably be adapted to deliver the fluid in a direction being substantially parallel to the velocity of the vortex in the receptacle at the point of delivery of the fluid.

The wall element constituting the bottom of the receptacle slopes preferably relatively to the horizontal direction and a matter outlet may additionally and preferably be provided at the position where the bottom has it lowest internally positioned section.

The apparatus may preferably comprise or further comprise an infeed device for feeding material to be treated into fluid contained in the receptacle. Preferably, the infeed device may comprise conveyer means for conveying material to be treated into fluid contained in the receptacle, preferably at a position below the surface of the fluid. Such conveyer means may comprise a conveyer belt or a screw conveyer.

The infeed device may preferably be adapted to delivery the material to be treated in a direction being substantially parallel to the velocity of the vortex in the receptacle at the point of delivery. Furthermore, the infeed device may preferably be adapted to deliver the material at a speed being at least 50% of, preferably substantially the same the speed of the fluid at the position of delivery in the receptacle of the material.

Preferably, the infeed device may be adapted to or further adapted to deliver material under the surface of the fluid when the fluid is present in the receptacle. Typically and preferably, the infeed device may be adapted to or further adapted to deliver the material at least 100 mm under the surface of fluid when the fluid is present in the receptacle The apparatus may preferably further comprise a measuring device for measuring, preferably in a continuous manner, the mass of the material and/or the water content in the material being fed into the receptacle. Preferably, the measuring device may be arranged in the infeed device.

The apparatus according to the present invention may preferably and advantageously be adapted to treat material selected from the group consisting of straw, grass, corn cubs, wood etc or combinations thereof. Preferably, the treatment of the material may be a treatment or a combination of treatments at least assisting in rendering the material susceptible to fermentation.

In a second aspect, the present invention relates to a method of operating the apparatus according to first aspect of the invention. Such methods preferably comprise controlling the pump and the vortex generator so as to establish a vortex in the receptacle in the form of a conic helix.

The method may preferably comprise adding fluid to the receptacle preferably below the surface of the fluid present in the receptacle. Preferably, the addition of fluid to the receptacle may be in the form in a jet extending below the surface of the fluid present in the receptacle.

Preferably and advantageously, the method may comprise adjusting the fluid level in the receptacle so that the fluid is added below the surface or so that a jet of fluid, preferably being the fluid added to the receptacle, extends below the surface of the fluid present in the receptacle.

The method may preferably comprise recirculating at least a fraction of fluid extracted from the receptacle through the discharge element. The fraction of fluid being re-circulated may preferably be freed from material present in the fluid when the fluid where in the receptacle.

Additionally, the method may preferably comprise determining the water content of the material leaving the receptacle based on at least a detection of the water level in the receptacle, the water fed to the receptacle, the mass of the material fed to the receptacle and the water content of the material.

The first and second aspects of the present invention may each be combined with any of the other aspects. These and other aspects of the invention will be apparent from and elucidated with reference to the embodiments described hereinafter.

Particular preferred embodiments of the present invention relates to soaking of the material in water containing acid.

Although the present invention has turned out to be useful in connection with processing of material in other situations than to assist in rendering the organic susceptible to fermentation, the description herein focus on that purpose. This should not limit the scope of the present invention to appliances and methods for bio ethanol production only.

BRIEF DESCRIPTION OF THE FIGURES

The present invention and in particular preferred embodiments thereof will now be disclosed in connection with the accompanying figures in which.

The figures show ways of implementing the present invention and are not to be construed as being limiting to other possible embodiments falling within the scope of the attached claim set.

DETAILED DESCRIPTION OF AN EMBODIMENT

Figures 1A, 1B, 1C:
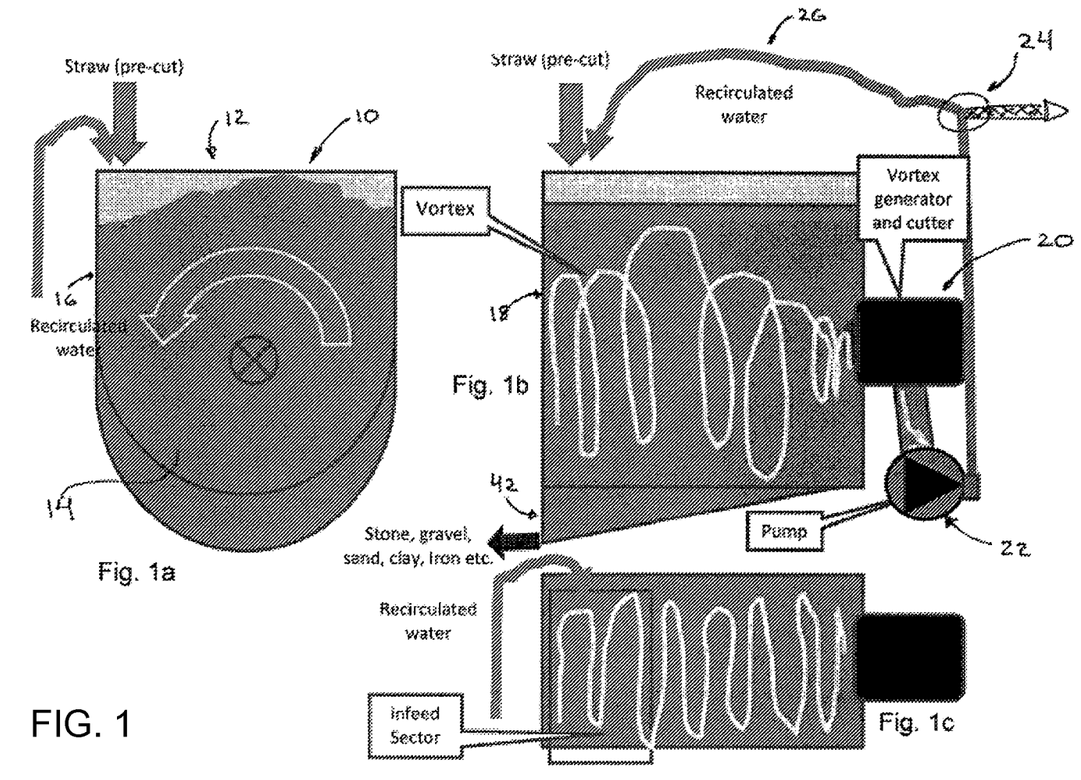
FIG. 1 shows a first embodiment according to the present invention.

FIG. 1 shows a first embodiment of an apparatus for treating material according to the present invention. FIG. 1*a* shows the apparatus in an end projection view, 1*b* in a side projection view and FIG. 1*c* in a top projection view. The apparatus comprising a receptacle 10 being shaped as a container having an open upper end and a curved bottom 14. The side walls 16 as well as the end walls 18 of the receptacle are flat members and the various walls and bottom are welded together to form a fluid tight—open upper ended container.

The material to be treated is preferably one or more of the material selected from the group consisting of straw, corn cubs, grass, wood and the like, but at least in principle each particulate organic can be considered. Combinations of material can also be considered. The material is typically particulate matter that desirably should be cut into smaller pieces. The fluid utilised in the present context is preferably water, although other fluid may be used and selected in accordance with a particular use of the apparatus.

At one of the end wall 18 (the one shown to the right in FIG. 1) a discharge element 20 is arranged. This discharge element 20 is adapted to generate a vortex flow pattern in the receptacle as indicated in FIG. 1 and at the same time cut material flowing towards the discharge element 20 into smaller pieces. In an alternative configuration, that will be disclose below, no cutting takes place and the discharge element provides a discharge with no cutting action involved. As will be disclosed in further details below, the cutting may e.g. be provided by a rotating cutting element comprising radially extending arms having cutting edges. Upon rotation of such a cutting element, material will be cut and a vortex in the fluid generated. Thus, the cutting action and the vortex generation feature are combined into a single element, although this does not necessarily has to be so as two separate means, e.g. a cutter and a vortex generator may be applied.

As it appears from FIG. 1*a* the bottom 14 is curved and in the embodiment shown curved so as to be shaped as a longitudinal cut in a cylinder. This contour is advantageous in the sense that it reflects and assists the rotational flow in the vortex so that only limited possibilities for the flow to create secondary vortices are available. Although the side elements 16 could beneficial—as seen from a flow perspective—be curved to further avoid creation of secondary vortices they have been made as flat member to ease introduction into the receptacle of material to be treated.

Downstream of the discharge element 20 a pump 22 is arranged that pumps the fluid with cut material through the discharge element 20 towards a separator 24 that separates out a stream of fluid comprising substantially all the cut material from the fluid. The pump furthermore provides suction via the discharge element 20 in the receptacle 10. The fluid containing substantially no cut material, referred to as a residual stream, similarly separated out in the separator 24 is feed back into the receptacle by a recirculation flow line 26. In an optimal separation process the residual stream does not contain any material. However, separation may in many practical embodiments be less that ideal and the amount of material in the residual stream depends on the efficiency of the separator. Thus, substantially, is in this connection preferably used to means a situation reflecting the efficiency of the separator.

The pump 22 gives the possibility to transfer and also pressurize the media as a fluid in which the material has been assimilated for further processing 24. The further processing can be e.g. separation process where the material is separated from the fluid, and the fluid is e.g. returned to the container.

If the further processing is a separation it may e.g. be embodied in the form of a screw press, a filter or centrifuge or means for sedimentation of the treated.

Thus, the separation in the separator 24 provides a stream of fluid with cut material where the content of cut material per total volume quantity is increased. This stream of up-concentrated cut material is feed to a further treatment to render it ready for fermentation.

The vortex flow pattern generated in the receptacle 10 should preferably be characterised in that no recirculation internally in the receptacle is generated. Thus, a fluid element wills on its way from the outlet of the recirculation flow line 26 follow constantly a spiralling motion around a horizontal axis—with no recirculation—advancing the fluid element toward and through the discharge element 20. Such a flow pattern is considered to be a conic helix. By such a flow pattern, material that is "trapped" by the vortex will inevitably end up in the discharge element only once and as the discharge element is performing the cutting of the material, the material will only be cut once.

The conic helix is accordingly a three dimensional vortex in which the velocity in the direction of the horizontal axis (or in general towards the discharge element) is controllable by controlling the pump. A high through flow through the pump will generate relatively higher velocity towards the discharge element than a relatively lower through flow through the pump. It should be mentioned as the velocities close to the wall parts goes towards zero when the wall parts are stationary.

This allows for a highly controllable cutting process, in which the size into the material is cut is controllable, as the speed of advancing the material towards the discharge element 20 can be controlled by controlling the pump and the cutting speed (by setting the speed of the cutting edge) of the cutting element of discharge element 20.

In a specific embodiment, the material to be processed is cut before being introduced into the receptacle and the material is alternatively extracted from the centre of the vortex.

Figure 2:
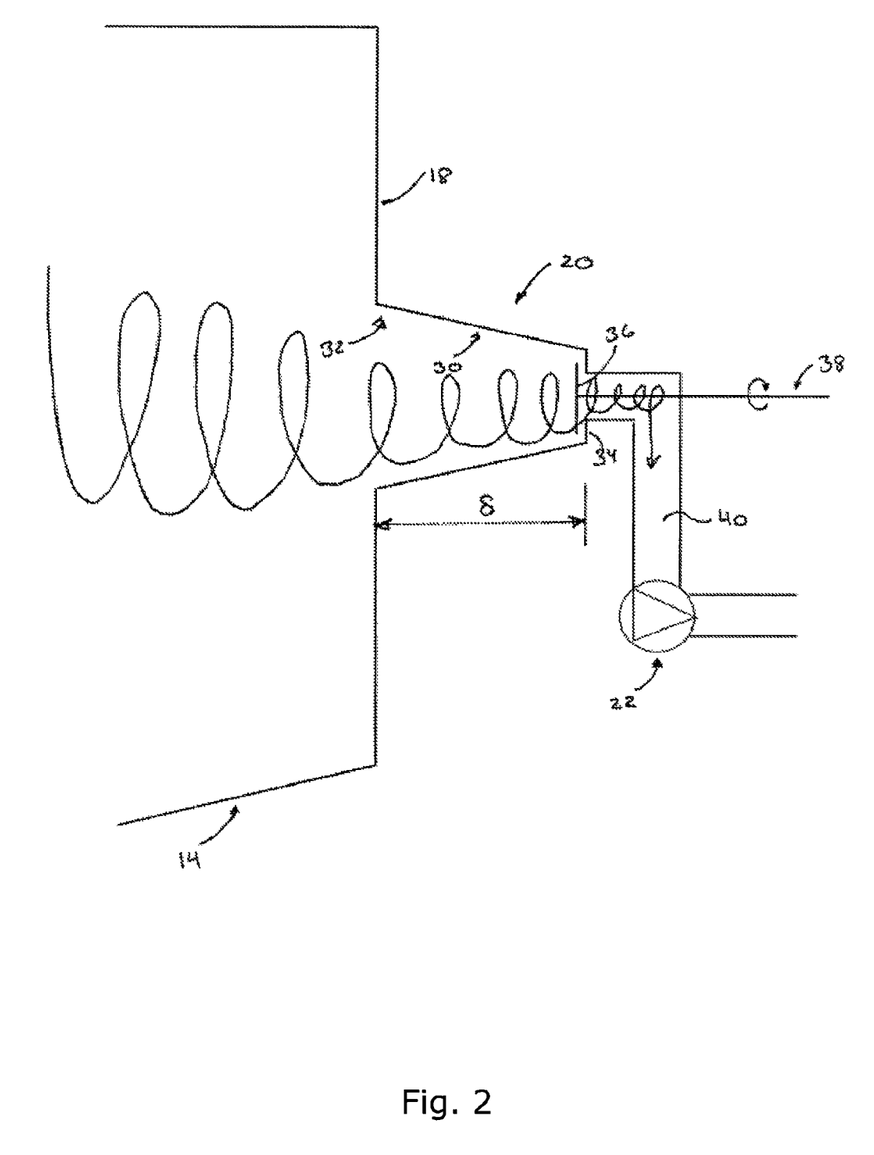
FIG. 2 shows a cross sectional view of the discharge element according to the present invention.

FIG. 2 shows schematically a cross sectional view the discharge element 20 of the embodiment shown in FIG. 1. The discharge element comprising a flow channel in the form of a funnel 30 extending out from the receptacle 10 and being attached at its broad end 32 to the end wall 18 whereby the discharge element 20 is in fluid communication with the interior of the receptacle 10. The funnel 30 is tapering towards the cutting element 36, so that the narrow end 34 of the funnel 30 is arranged retracted from the receptacle at a distance δ as shown in FIG. 2. At the narrow end 34 the cutting element 36 is arranged on a shaft 38 that is connected to an electrical motor (not shown).

The cutting element 36 is arranged in front of a fluid connection 40 extending towards the pump 22. The fluid connection 40 is typically in the form of a pipe. The cutting element 36 is shaped as arms extending radially from a centre coinciding with the rotational axis of the shaft 38 and having cutting edges pointing in the rotational direction.

Upon rotation of the cutting element, a vortex will be generated extending into the receptacle and into the fluid connection 40. Thus, the cutting element also embodies the vortex generator. The pump generates a flow of fluid from the receptacle towards the cutting element 36. Thereby a flow pattern that may be seen as being made up by super-positioning a non-rotating flow towards the cutting element generated by the pump 22 and the vortex generated by the rotating cutting element 36. Thus, material containing in the fluid in the receptacle will be transported to the cutting element 36, being cut by the cutting element, through the channel 40 towards the separator element 24.

Although the pump 22 and the cutting element are embodied as two different elements, these elements may be made into a single element. In such embodiments, the cutting element and in particular the arms with cutting edges are shaped so as to increase the total pressure of the fluid. An example of such an embodiment is a centrifugal impeller having cutting means arranged in its inlet.

By use of the funnel 30, backflow in the discharge element—and in the receptacle in general—is minimised and typically fully avoided. Thereby, it may be guaranteed to a large extend that material to be cut pass the cutting element only once as cut material is not fed back into the receptacle. The latter would typically result in depositing of cut material in the receptacle and/or the material being cut into non-controllable sizes.

Figure 3:
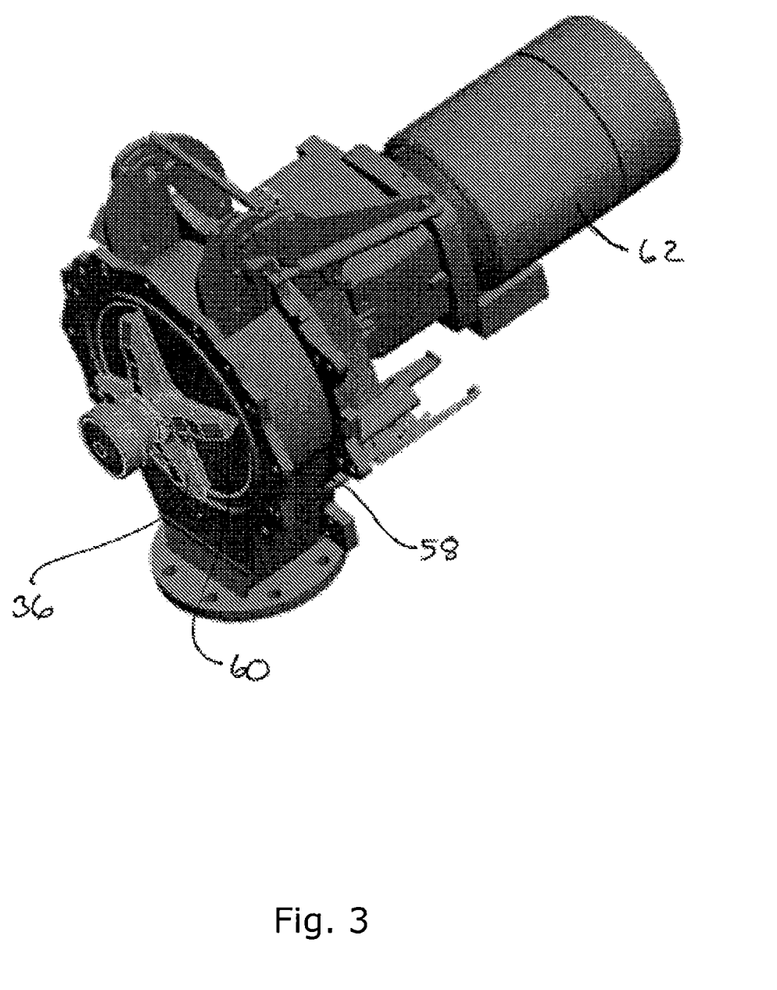
FIG. 3 shows an embodiment of a vortex generator.

FIG. 3 shows inter alia the cutting element which cuts the material and generates the vortex. The funnel 30 is to be bolted to the flange 58. Fluid and cut material goes through the opening towards pump 22 (not shown) as disclosed in connection with FIG. 1. The cutting element is arranged on a shaft extending from an electrical motor 62.

Reverting now to FIG. 1, separation of contaminating matter performed in the apparatus will now be disclosed. Contaminating matter are in typically considered to be matter that could interfere, in negative sense, further treatment of the organic material and/or the fermentation and includes e.g. stones, gravel, metal particles etc. As shown in FIG. 1, and in particular in FIG. 1*b*, the bottom 14 of the receptacle slopes downwardly (in relation to the horizontal direction) away from the discharge element 20.

The contaminating matter is typically characterised in that the density of the particles are substantially different from the density of both the fluid and the material to be cut. Accordingly, and as a vortex is present in the receptacle contaminating matter, e.g. in the form of particles, will be drop directly towards the bottom 14 due to the gravity or be forced towards the bottom by a combination of a centrifugal force originating from the particle following at least to some extend the spiralling motion of the vortex in combination with the action of the gravity. A matter outlet 42 is arranged at the lowest positioned section of the sloping bottom; in the embodiment shown in FIG. 1, this is the left corner of the receptacle as shown in FIG. 1*b*.

Once contaminating matter is located on the surface of the sloping bottom, the gravity will force it or at least assist in forcing it towards the matter outlet 42. Depending on how the matter is extracted from the receptacle some fluid may leave the receptacle with the matter. However, the amount of fluid withdrawn from the receptacle along with the matter is typically chosen so small that it does not destroy the vortex flow pattern inside the receptacle.

It appears from the above that both a cutting and soaking of the material takes place in the apparatus according to the present invention. In a further aspect the apparatus is adapted to perform a soaking while the cutting feature is left out. This aspect is embodied by including the same elements as disclosed above although the rotating cutting element is replaced with a rotor comprising rotor arms with blunt edges so that a contact between the rotor arms and the material does not create a cutting of the material. It should be mentioned that some kind of ripping, tearing or similar action may be carried out on the material by the rotating rotor arms. However, such action should be minimised and it not considered as a cutting action as such an action requires some kind of cutting edge.

The vortex inside the receptacle generated by the rotor or the rotating cutting element may be strengthened by a number of different means. For instance, the end wall 18- or a separate wall element internally positioned adjacent to the end wall 18—opposite to the discharge element 20 may be made rotatable in the same direction as the rotation of the vortex. This will alter the boundary conditions for the vortex at the end wall from zero velocity to a velocity being different from zero whereby the vortex is strengthened. Similarly or in combination therewith, the end wall (or a separate wall element) at the discharge element 20 may be made rotatable.

Another example on strengthening of the vortex is to apply more that one discharge element, such as two, three, four or more discharge elements. For instance, two discharge elements positioned adjacent to each other in the same wall element will each create a vortex in the funnels extending into the receptacle. The vortices from the funnels will merge into a single vortex in receptacle. If discharge elements are arranged opposite to each other on opposite end wall of the receptacle similar results is achieved although such a configuration requires that the cutting elements or the rotor arms rotate in the same direction (when seen from one direction) so that the vortices created rotate in same direction; if not, the vortices tend to destroy each other. Thus, preferred configurations comprises discharge elements on the two opposite end wall 18 or discharge elements positioned in one of the end walls 18 only. It should be emphasised that these configuration are combinable and are applicable in embodiments pertaining to e.g. washing, soaking, cutting etc or combinations thereof.

One of the features of the present invention pertains to soaking of material. Typically, the material to be soaked has initially a density that makes it flow on surface of the fluid in the receptacle. It has been found in connection with the present invention that once such material is caught by the vortex, the vortex flow will transport the material towards the core of the vortex. The amount of fluid soaked by the material relates inter alia to the retention time of the material in the fluid and as the material goes towards the core of the vortex and the flow rate in the direction towards the discharge means is controllable by the pump 22, the retention time of the material may be controlled.

Feeding of the material—that often will flow on the surface of the liquid if no other measures are taken—may advantageously and preferably be provided by accelerating the material and deliver the accelerated material so far in the vortex that the buoyancy is outbalanced by the viscous forces acting on the material by the vortex. The acceleration of the material is often done so that the introduction of the material does not slow down the speed of the vortex. This results in that the material is dragged along with the motion of the vortex in many cases at the same radial position. During this motion, the material will gradually suck liquid resulting in a change in the buoyancy properties of the material which in turn results in that the material flows towards the centre of the vortex. In many practical embodiments, the vortex comprises a radial velocity component in the direction towards the centre of the vortex and that radial velocity component will at least assist in forcing the material towards the centre of the vortex.

Figure 4A:
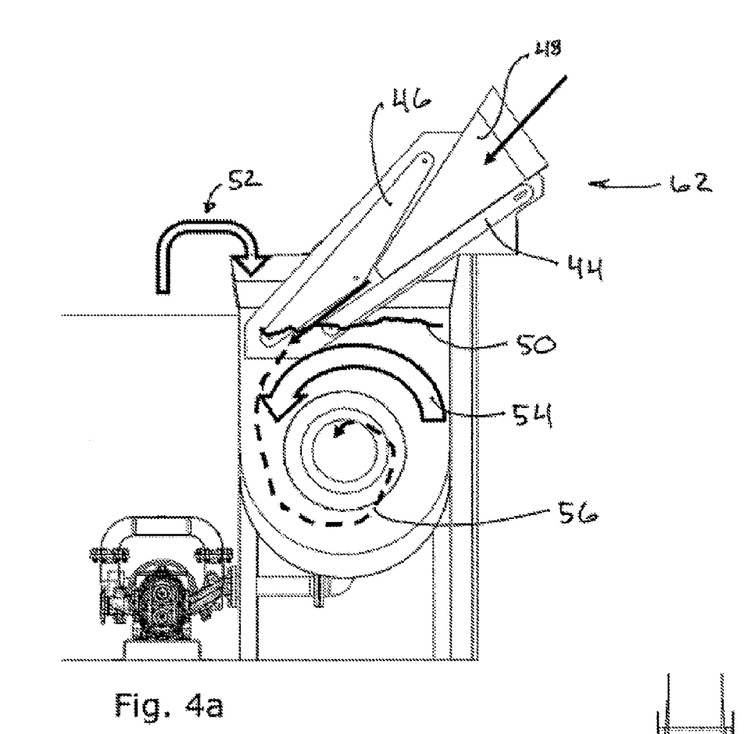
FIG. 4*a* shows an end view of an embodiment of the apparatus according to the present invention in which an infeed device is applied.

Feeding of the material into the vortex is advantageously and preferably carried out by utilising the flow of the re-circulated fluid added to the receptacle by a fluid feed 52 (FIG. 4*a*). The fluid feed 52 is preferably positioned so that the re-circulated fluid is introduced under the free surface of the fluid present in the receptacle preferably in the form of a jet as outlined above. In the embodiment shown in FIG. 1, the fluid feed 52 is the end of the recirculation flow line 26 extending into the fluid in the receptacle. The position where and direction in which the fluid is introduced is selected so that the direction is substantially parallel to the velocity of the rotational motion of the vortex standing in the receptacle at the point of delivery as outlined above. This is in the embodiment shown in FIG. 1 below the surface in the corner region of the receptacle. Material to be soaked, cut and/or washed is introduced below free surface in such manner that the jet of re-circulated fluid at least assist in introducing the material into the vortex.

Introduction of the material into the jet of re-circulated fluid is preferably done by a material inlet comprising suitable conveyer means such as conveyer belts, conveyer screws or the like. Referring to FIG. 4, one embodiment of an infeed device is disclosed. The infeed comprising a conveyer and the conveyer speed is preferably set match the rotational velocity of the vortex so that the material is introduced into the vortex with substantially no difference in speed.

Furthermore, as the amount of fluid fed into the receptacle, the amount of fluid discharged from the receptacle and the amount of material introduced into the receptacle can be determined at least an estimate on the fluid content in the material after soaking may be established. The estimate may be based on the principle of continuity including measurements of various amounts entering and leaving the receptacle 10. Accordingly, the level of the liquid in the receptacle may be adjusted by controlling the amount of liquid fed to the receptacle through the fluid feed 52.

In a further embodiment, the apparatus according to the present invention is used for washing the material with no cutting performed. In this connection washing preferably means that contaminating matter is separated off or at least loosened from the material. In such cases the soaking issue may be considered as irrelevant and the retention time not adjusted to meet a given fluid content. The retention time is in such instances adjusted to allow sufficient time to e.g. loosen, tangling out, etc, of the contaminating matter. Instead the flow through the apparatus and the characteristics of the vortex are controlled so as to provide the required washing treatment.

Thus, the present invention is suited both for soaking material that has been cut and for soaking and cutting material, as well as washing material either as a separate action or in combination with soaking and/or cutting.

The present invention is also suited in combination with soaking, washing and/or cutting to enable deposition of chemicals in the material such as homogeneous deposition of acid content in the entire depth of the material to facilitate thermal hydrolysis.

As shown above, the discharge element 20 preferably comprises a flow channel 30. However, it is envisaged that the flow channel may be left out and the vortex generator be arranged inside the receptacle.

Figure 4B:
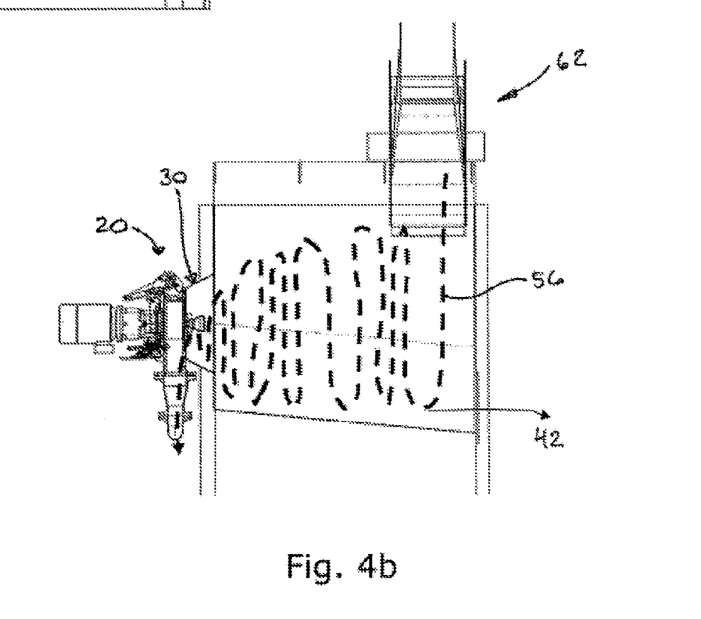
FIG. 4*b* shows a side-on view of an embodiment of the apparatus of the present invention as shown in FIG. 4*a* in which an infeed device is applied.

FIG. 4 shows an embodiment of an apparatus according to the present invention. Parts in FIG. 4 corresponding to those of FIG. 1, 2 and have been provided the same numerals. A number of elements have been left out (e.g. the separator 24 and recirculation flow line 26) for clarity reasons only. FIG. 4a shows the embodiment from as seen towards the end wall 18 similar to FIG. 1b and FIG. 4b shown the embodiment in a side view similar to FIG. 1b.

The embodiment shown in FIG. 4 comprises an infeed device 62 through which the material 48 is fed into the fluid contained in the receptacle. The infeed device comprising a conveyer belts 44 and 46. The speed of the conveyer belt equals substantially the velocity of the vortex at a position 100 mm below the surface of the liquid. Furthermore the infeed device is arranged so that the material is delivered where the velocity of the vortex is directed downward.

The apparatus preferably also comprises a measuring device—preferably embodied in the infeed device. The measuring device measures, preferably in a continuous manner, the mass of the material and/or the water content in the material. Based on such measurement and detection of the water level in the receptacle and the water fed to the receptacle the water content in the material leaving the receptacle may be established (from the principle of continuity stipulating that no in case no accumulation of mass occur in the receptacle, the mass entering and leaving the receptacle must equal).

The infeed device 62 and in particular the conveyer belt 44 transport the material to be treated introduces the material into the fluid at a position below the surface 50 of the fluid. The re-circulated fluid 52 is introduced to the receptacle 10 at the same position as the material (as disclosed above) in a direction being substantially parallel to the velocity of the vortex 54 at the point of delivery. By introducing the re-circulated fluid in this manner, the introduction may stimulate the flow of the vortex. Similarly, the infeed device 62 delivers the material in a direction being substantially parallel to the velocity of the vortex 54 at the point of delivery. Thereby the combination of the vortex 54, the conveyer belt 44 and the re-circulated fluid 52 will trap the material in the vortex flow so that the material follows the vortex flow towards the discharge element schematically indicated by the dotted line 56. It should be mentioned that the re-circulated fluid may be replaced by fresh fluid in the above embodiments.

Figure 5A:
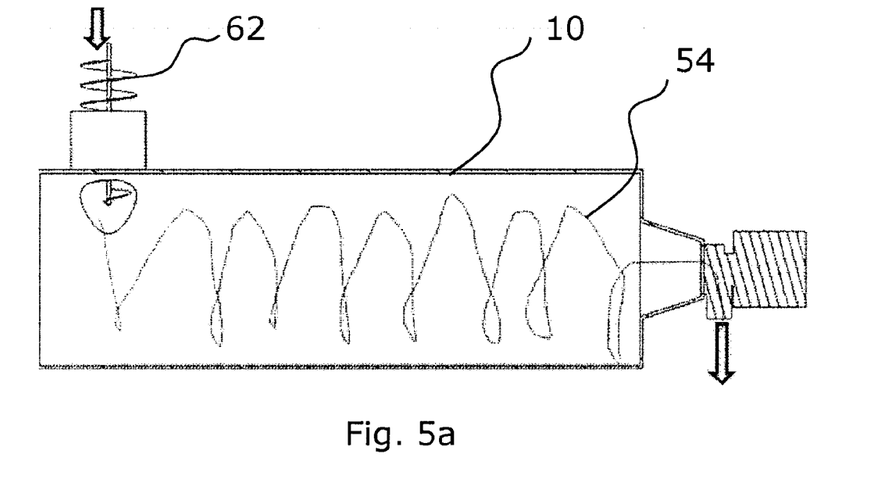
FIG. 5*a* shows an embodiment of the apparatus according to the present invention in which an alternative infeed device is applied.

FIG. 5a shows an embodiment of the apparatus according to the present invention in which an alternative infeed device 62 is applied to a receptacle 10. The infeed device is adapted to arrange the material into the vortex and the infeed device is adapted to deliver the material in a direction being substantially parallel to the velocity of the vortex at the point of delivery. In this embodiment the infeed device 62 is a screw conveyor which is especially advantageous for conveying dry matter. By using a screw conveyor to introduce the unsoaked material 48 into the vortex 54 appropriate speed and direction of the unsoaked material can be obtained regardless of the material to be introduced not being pumpable.

Figure 5B:
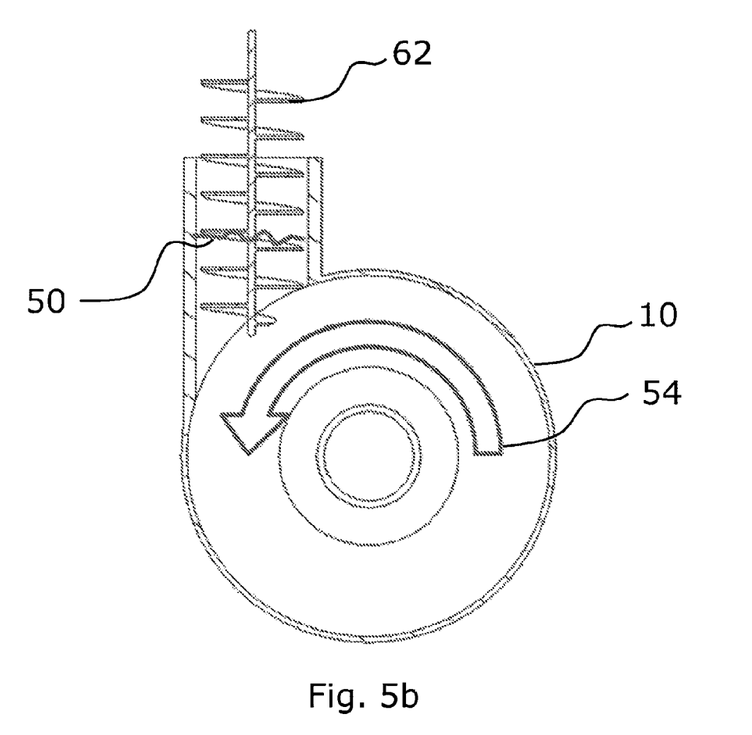
FIG. 5*b* shows the embodiment of the apparatus according to the present invention shown in FIG. 5*a* in which an alternative infeed device is applied.

FIG. 5b shows the embodiment of the apparatus of FIG. 5a according to the present invention in which an alternative infeed device 62 is applied. FIG. 5b shows cross sectional view through the infeed device 62 perpendicular to the longitudinal direction of the apparatus.

It should be noted that the device according to FIG. 5 may be used either with fluid surface inside the receptacle 10 or as indicated in FIG. 5b being filled with fluid so that the fluid surface 50 will be above the upper surface of the receptacle 10.

In the above disclosed embodiments the receptacle is in many instances disclosed as a container in which a free surface exist, however, the invention may also be embodied in e.g. a circular container e.g. in a cylinder as shown in FIG. 5.

As indicated above, the present invention may include soaking and/or other treatments being different from cutting. For instance, the material may be treated by one or more enzyme and/or one or more chemical reactions such as reactions involving one or more acids. Such treatment may be effectuated by adding enzymes and/or chemical to the fluid present in the receptacle. Examples of enzymes are feruloyl esterase, dextranase, amylase, glucoamylase, betaglucanase, xylanase etc. Examples of chemicals are sulphuric acids or sodium hydroxide.

Soaking as referred to in this document—and in particularly in the section background of the invention—is preferably referred to as the effect of absorbing a fluid in a material through or as if through pores or interstices in the material. Soaking is therefore the process occurring between the time unsoaked material is put in contact with a fluid to the time where the unsoaked material is completely soaked with the fluid i.e. saturated with the fluid. Soaking therefore dynamically changes the hydrostatic properties of an unsoaked material as function of time. Soaking rates can be increased by addition of energy such as mechanical work e.g. rotation in a washing machine or heat transfer e.g. heating in a boiler. It should be noted that the present invention is not limited to completely soaking the material.

An important control parameter when seeking to soak hydrophobic material in the most efficient way is the retention time i.e. the time from where the unsoaked material enters the receptacle to the time where the material leaves the receptacle. By the apparatus according to the present invention the retention time can be controlled with high accuracy, since substantially no re-circulation occurs in the receptacle. Therefore a close to constant flow through the receptacle ensures that all unsoaked material will experience the same retention time. Compared to conventional pulpers large pieces of pulp experience long retention times whereas small pieces of pulp experience short retention times. In applications such as biomass degradation the retention time is a crucial parameter since it controls the penetration depth of the fluid in combination with enzymes and/or chemicals thereby controlling the degradation mechanism. If the retention time cannot be controlled different parts of the material will have very different penetration depths.

In order to optimize conditions for the vortex flow in the receptacle different energy inputs can be made which seeks to stabilize the vortex flow by minimizing losses to the surrounding surfaces. In preferred embodiments, this may be accomplished by rotating the wall opposite to the vortex generator the friction loss can be minimized. In addition thereto or used alone, the flow channel extending out from the receptacle wherein the vortex generator can be placed can be rotated such that the flow channel rotates together with the vortex generator around a common axis thereby minimizing fluid friction in the boundary layer near the inner surface of the flow channel.

Furthermore energy inputs to the vortex in the receptacle by further means introduced in the receptacle such as a rotating cylinder in the center helical vortex can be used to add energy to the vortex.

Also energy inputs to the vortex in the receptacle can be made by the unsoaked material as described above by introducing the material in the receptacle at a given position with a given position and speed and direction. The further means adapted to arrange unsoaked material in the vortex can also in itself be constructed to posses the ability to introduce additional energy to the vortex e.g. a conveyor belt with or without pulleys that adds energy to the vortex (refer e.g. to FIG. 4 for a conveyer belt). Optimizing the conditions for the vortex by the introduction of unsoaked material or by means adapted to arrange unsoaked material in the vortex is preferably done substantially parallel to the velocity of the vortex at the point of delivery.

When the vortex generator is placed outside the receptacle such as in the flow channel the fluid in the receptacle is forced to flow in a vortex through the fluid coupling between the fluid in the receptacle and the fluid in the flow channel, when defining these two fluid volumes connected by a fluid coupling i.e. the surface between the volumes, the fluid connection can be defined as the vortex generator in the receptacle.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously and preferably combined, and the mentioning of these features in different claims does not exclude that a combination of features is not possible and advantageous.

The invention claimed is:

1. A method of treating an organic material rising cutting, soaking and/or washing said organic material, said method comprising:
   operating an apparatus, the apparatus comprising:
      a receptacle comprising wall elements defining a container adapted to contain fluid and material to be treated,
      a discharge element in upstream fluid communication with the interior of the receptacle and in downstream fluid communication with a fluid connection,
      a vortex generator for forming a vortex in the fluid, wherein the vortex comprises angular and axial flow components,
      an infeed device for feeding material to be treated into the vortex formed in the fluid,
      a pump arranged downstream of the discharge element in order to pump fluid with material from the infeed device towards the discharge element and into the downstream fluid connection,
      a user operable pump controller operably connected to said pump to control a rate of pumping of said fluid by said pump,
      the vortex generator and pump in combination being adapted to generate a vortex in the form of a conic helix in the fluid that traverses the entire length of said receptacle in an axial direction when in use, wherein the axial flow component of the vortex flows in a direction from the infeed device toward the discharge element, and wherein a flow rate of the axial flow component of the vortex is controlled by controlling the pump,
   the method further comprising:
      controlling the pump and the vortex generator so as to establish a vortex in the receptacle in the form of a conic helix, and so that substantially no recirculation internally in the receptacle is generated,
      feeding material to be treated into the vortex, such that the material is trapped within the conic helix, and
      controlling the pump so that the flow rate of the axial flow component of the vortex is controlled, thereby controlling the speed at which the material is pumped from the infeed device towards the discharge element and into the downstream fluid connection, thereby controlling the retention time of the material in the receptacle.

2. The method according to claim 1, the method comprising adding fluid to the receptacle below the surface of the fluid present in the receptacle.

3. The method according to claim 1, the method comprising adding fluid to the receptacle in a jet extending below the surface of the fluid present in the receptacle.

4. The method according to claim 1, the method comprising adjusting the fluid level in the receptacle so that the fluid is added below the surface or so that a jet of fluid, being the fluid added to the receptacle, extends below the surface of the fluid present in the receptacle.

5. The method according to claim 1, the method comprising recirculating at least a fraction of fluid extracted from the receptacle through the discharge element.

6. The method according to claim 5, wherein the fraction of fluid being recirculated is separated from material present in the fluid when the fluid was in the receptacle.

7. The method according to claim 5, wherein the introduction of the re-circulated fluid to the receptacle stimulates the flow of the vortex.

8. The method according to claim 1, comprising determining the water content of the material leaving the receptacle based on at least a detection of the water level in the receptacle, the water fed to the receptacle, the mass of the material fed to the receptacle and the water content of the material.

9. The method according to claim 1, the method comprising adding fluid to the receptacle in a direction being substantially parallel to the velocity of the vortex in the receptacle at the point of delivery of the fluid.

10. The method according to claim 1, wherein the apparatus comprises more than one discharge element.

11. The method according to claim 10, wherein the discharge elements are positioned adjacent to each other in the same wall elements.

12. The method according to claim 10, wherein the discharge elements are positioned opposite to each other in opposite wall elements.

* * * * *